United States Patent [19]
Cotton et al.

[11] Patent Number: 5,335,435
[45] Date of Patent: Aug. 9, 1994

[54] MEDIA HOLDER AND DISPLAY

[76] Inventors: Manny Cotton, 11473 Riverside Dr., #302, Studio City, Calif. 91607; George Sanchez, 19147 Kinzie St., Northridge, Calif. 91324; Bernardo Baran, 6311 Rhea Ave., Reseda, Calif. 91335

[21] Appl. No.: 964,027

[22] Filed: Oct. 20, 1992

[51] Int. Cl.⁵ ............................................. B42F 17/22
[52] U.S. Cl. ........................................ 40/395; 40/534; 312/193.4
[58] Field of Search ................. 40/388, 389, 391, 394, 40/395, 373, 376, 405, 530, 534, 537, 371, 372, 492, 508, 509; 312/189, 193.4; 206/425, 444

[56] References Cited

U.S. PATENT DOCUMENTS

| | | | |
|---|---|---|---|
| 1,900,073 | 3/1933 | Peel | 40/395 |
| 2,167,578 | 7/1939 | Finch | 40/391 |
| 3,269,390 | 8/1966 | Standish | 40/388 X |
| 4,091,918 | 5/1978 | Sovlakis et al. | 40/388 X |
| 4,366,904 | 1/1983 | Roskvist | 206/425 |
| 4,498,583 | 2/1985 | Long et al. | 206/444 |
| 4,609,231 | 9/1986 | Neuman | 312/15 |
| 4,629,067 | 12/1986 | Pavlik et al. | 206/425 |
| 4,695,103 | 9/1987 | MacDonald et al. | 206/425 X |
| 4,781,292 | 11/1988 | Sacherman et al. | 206/425 X |
| 4,826,020 | 5/1989 | Davis | 211/40 |
| 4,864,753 | 9/1989 | Janssen et al. | 40/530 V |
| 4,911,506 | 3/1990 | Stefan | 312/16 |
| 5,027,950 | 7/1991 | Gutierrez et al. | 206/425 |

*Primary Examiner*—Kenneth J. Dorner
*Assistant Examiner*—J. Bonifanti
*Attorney, Agent, or Firm*—Timothy T. Tyson

[57] ABSTRACT

A media holder (20) is disclosed particularly suited for search and display of a selected media. The holder has a plurality of frames (22) each configured to hold media (e.g. business cards, compact discs, computer diskettes) and pivotally mounted over a slidable striking member (44). The striking member contacts an abutment member (50) defined by each frame to flip the frame for viewing.

19 Claims, 3 Drawing Sheets

MEDIA HOLDER AND DISPLAY

TECHNICAL FIELD

The present invention relates generally to media holders and more particularly to holders configured for display of a selected media.

BACKGROUND ART

U.S. Patents directed to media storage include U.S. Pat. Nos. 4,366,904; 4,498,583; 4,609,231; 4,629,067; 4,695,103; 4,781,292; 4,826,020; 4,911,506; and 5,027,950.

DISCLOSURE OF INVENTION

The present invention is directed to apparatus for storing media (e.g. business cards, baseball cards, compact discs, computer diskettes, address forms, photographs, index cards) and displaying a selected one thereof.

Apparatus in accordance with the invention are characterized by a striking member slidably mounted beneath pivotally mounted frames each configured to carry and display media and each defining an abutment member. Movement of the striking member in first and second opposed directions, by a user of the invention, successively contacts the abutment members to flip the frames for viewing thereof.

In accordance with a feature of the invention the center of gravity of each frame is arranged above its pivot axis to facilitate pivoting.

In a preferred embodiment each abutment member comprises a pair of oppositely directed hooks and the striking member comprises a wire bail. Each frame defines a window to receive the hook of an adjacent frame for compact nesting thereof.

In a preferred embodiment the frames are mounted in a base which defines an inclined rest to position the frames for viewing of the media therein.

The novel features of the invention are set forth with particularity in the appended claims. The invention will be best understood from the following description when read in conjunction with the accompanying drawings.

MODES FOR CARRYING OUT THE INVENTION

Figure 1:
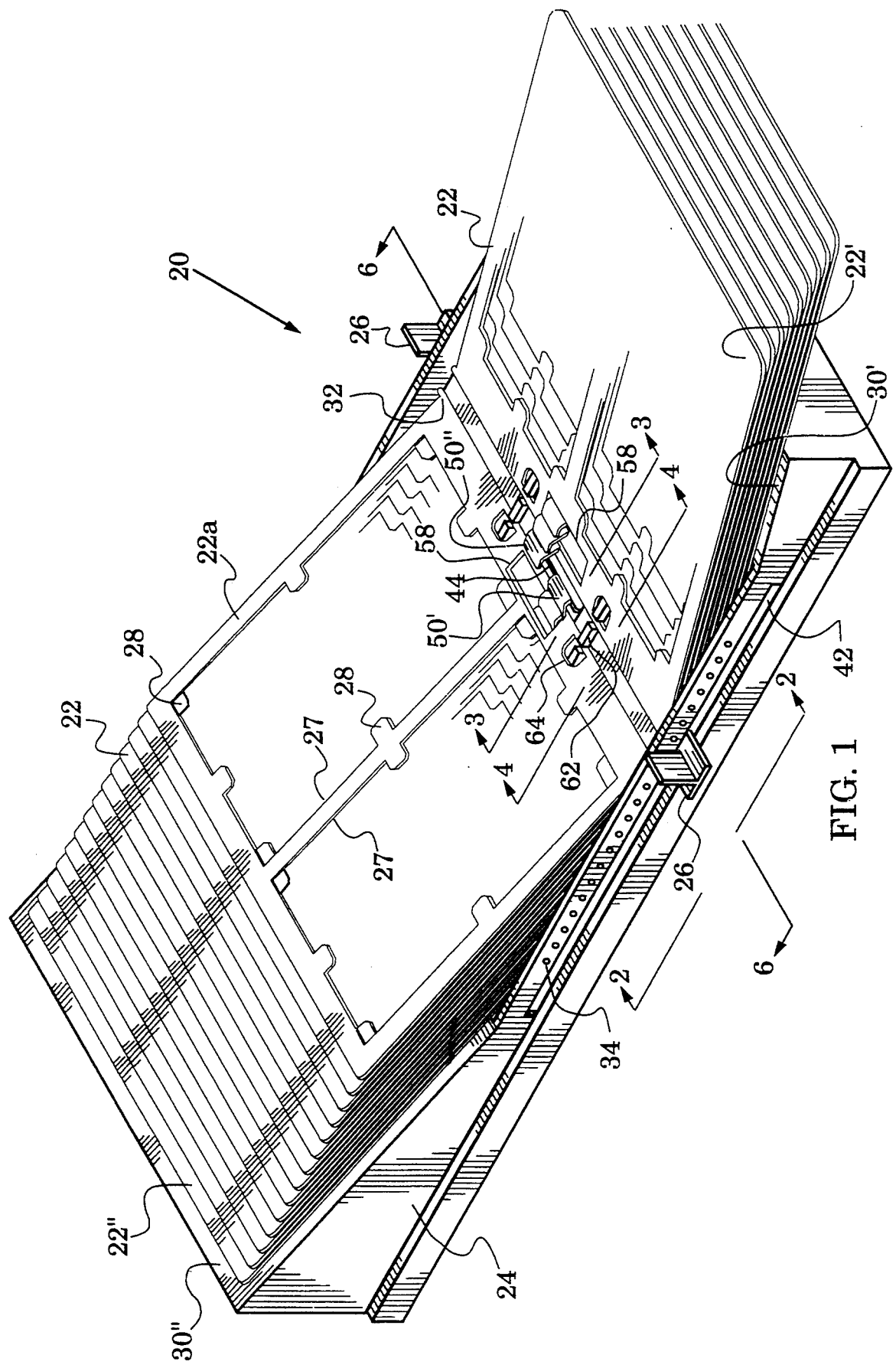
FIG. 1 is an isometric view of a preferred media holder embodiment in accordance with the present invention.

A preferred media holder embodiment 20, in accordance with the present invention, is illustrated in the isometric view of FIG. 1. The holder 20 includes a plurality of frames 22 each configured to hold four business cards (two cards back to back) and pivotably mounted in a base 24. A user of the holder 20 moves the tab 26 along the base 24 to successively flip each frame 22 from one end of the base 24 to the other and, in particular, cause a selected frame, e.g. frame 22a, to be positioned for display of the cards therein.

In the holder embodiment 20, each frame 22 defines a pair of apertures 27 with inward directed ears 28 about the perimeter thereof which are alternately offset to facilitate receiving pairs of business cards therebetween. Frame embodiments in accordance with the invention may be configured to hold various types of media (e.g. baseball cards, compact discs, computer diskettes, address forms, photographs, index cards) and dimensioned to hold any number of frames 22. Embodiments of the invention are particularly suited for economical fabrication from a variety of polymers.

Thus, the teachings of the invention provide compact storage for a plurality of media with quick access to and display of a selected one thereof.

Figure 2:
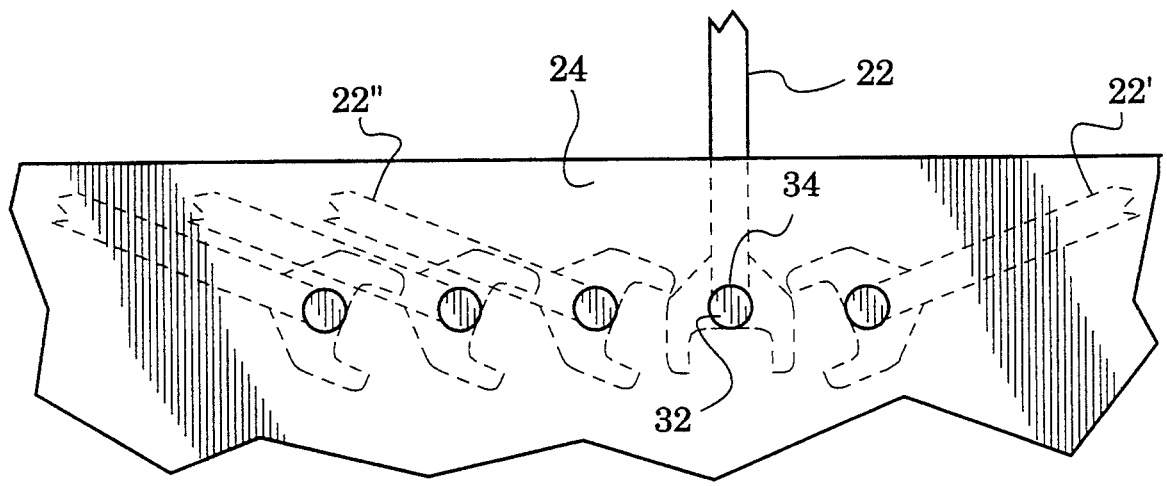
FIG. 2 is an enlarged sectional view along the plane 2—2 of FIG. 1.
Figure 6:
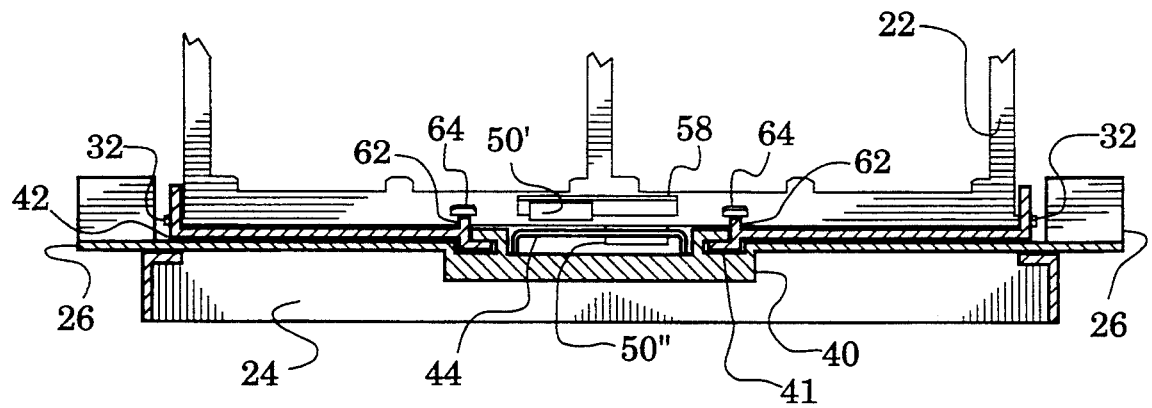
FIG. 6 is a sectional view along the plane 6—6 of FIG. 1.

The preferred embodiment is now described in detail with initial reference to FIG. 1, FIGS. 2, 3, and 4 which are respectively enlarged sectional views along the planes 2—2, 3—3 and 4—4 of FIG. 1 and FIG. 6 which is a sectional view along the plane 6—6 of FIG. 1. The base 24 is seen in FIG. 1 to define inclined rests 30', 30" at opposing ends which place the frames 22 in viewing positions. FIGS. 2, 6 illustrate that each frame 22 defines pivot pins 32 extending from opposite sides thereof which are pivotally inserted into holes (34 in FIG. 1) in the base sides to define an axis about which the frame pivots. This allows each frame to pivot from a position 22' defined by rest 30' to a position 22" defined by rest 30".

FIG. 6 further illustrates the T shaped tab 26 shown in FIG. 1 is one part of a carrier 40 which receives base rails 41 to be slidably mounted therealong (although not shown, the carrier 40 may comprise a plurality of mated parts to facilitate installation in the base 24). Oppositely directed tabs 26 extend outward through slots 42 (best seen in FIG. 1) defined in the base 24. A striking member in the form of a resilient wire bail 44 is transversely mounted in the carrier 40. Urging the tabs 26 in the direction of the slots 42, therefore, causes the carrier 40 and attached bail 44 to successively pass underneath the frames 22. The T shape defined, in the preferred embodiment, by the tabs 26 provides a convenient surface for the fingers of a user to contact. However, it should be understood that, in general, the tabs may define a variety of surfaces to facilitate manipulating the frames 22.

Figure 3:
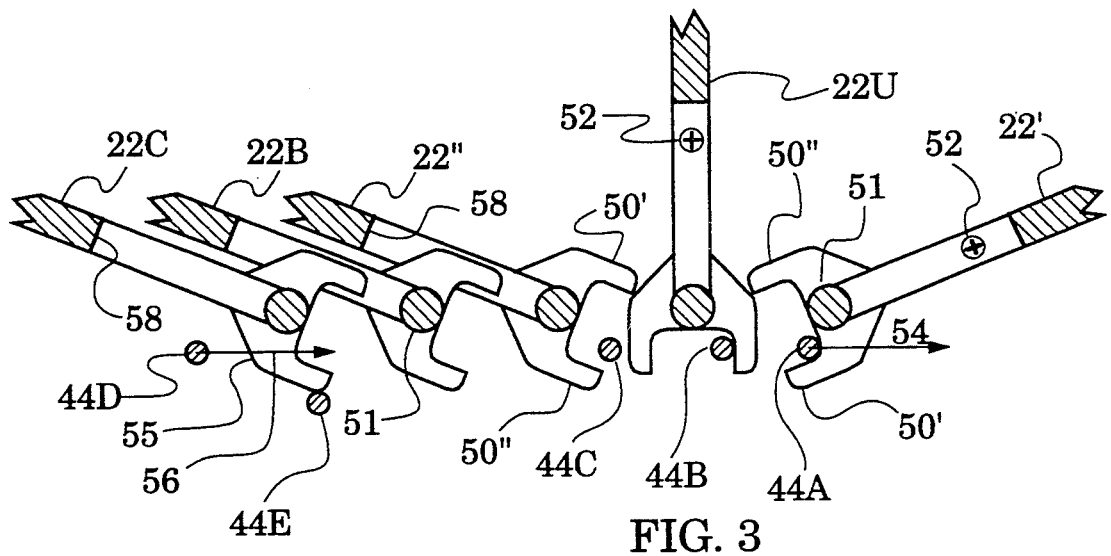
FIG. 3 is an enlarged sectional view along the plane 3—3 of FIG. 1.

Each frame 22 is shown in FIG. 3 to define an abutment member in the form of a pair of oppositely directed hooks 50',50" descending from the frame axis. The lower edge of each frame 22 terminates in a cylindrical contour 51 which is coaxial with the pivot pins 32 and the frame axis. The frame 22 is configured to place its center of gravity 52 above the frame axis. Thus when the bail (striking member) is in position 44A and moving in direction 54 in FIG. 3 it engages the hook 50' (abutment member) of a frame in the rest position 22'. Further carrier 40 movement brings the bail 44 to position 44B which urges the frame to the upright position 22U. Still further movement of the bail past position 44B (e.g. to position 44C) moves the frame center of gravity 52 past its axis and momentum and gravity pull the frame to the rest position 22" atop other frames 22B, 22C. It is apparent that when the bail 44 (e.g. from position 44c) is moved opposite direction 54 in FIG. 3 it engages hooks 50" to move the frames from rest position 22" to rest position 22'.

The frames 22 may also be manually pivoted without use of the carrier 40 and bail 44. In this case, it is possible to place the bail in a position 44D where the hooks 50" are directed away from it. To allow the bail 44 to re-engage the hooks, each hook 50 defines a shoulder 55 which urges the resilient bail 44 downward as the carrier 40 moves the bail in the direction 56, e.g. to a position 44E.

Each frame defines a window 58 to receive, in the rest position, the upward extending hook of an underlying frame to permit compact nesting of the frames. Thus in FIG. 1 hooks 50' and hooks 50" are shown nested below windows 58.

Figure 4:
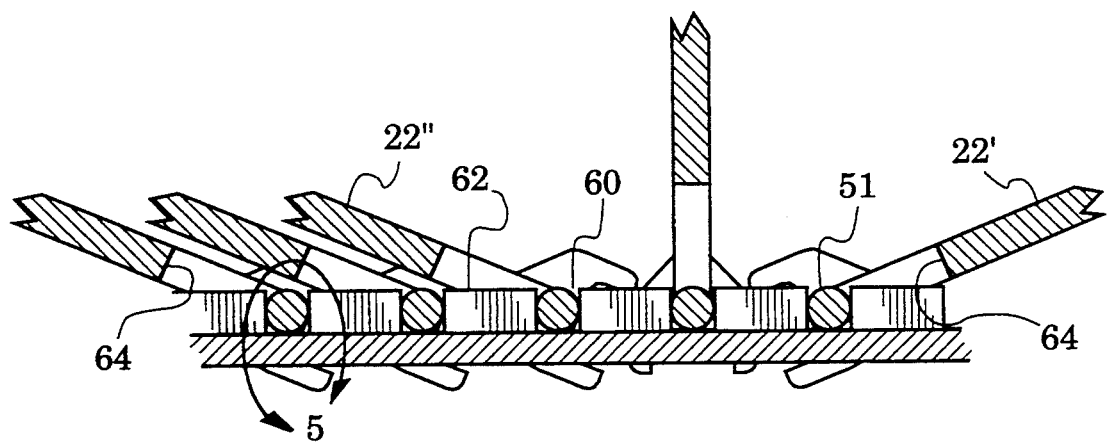
FIG. 4 is an enlarged sectional view along the plane 4—4 of FIG. 1.
Figure 5:
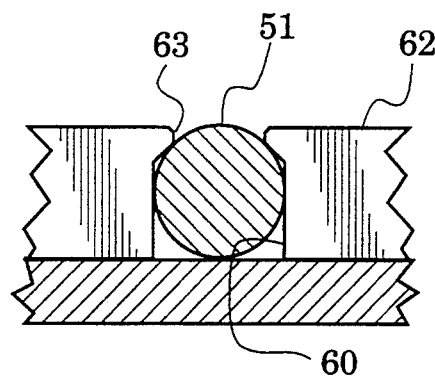
FIG. 5 is an enlarged view of the area within the line 5 of FIG. 4.

As seen in FIGS. 1, 4 the base 24 defines notches 60 in ribs 62 which receive the frame contours 51 for transverse support thereof as the bail 44 urges the hooks 50', 50" to flip frames between positions 22', 22". This support facilitates the use of relatively low strength materials configured in thin cross sections for space saving considerations. FIG. 5, which is an enlarged view of the area within the line 5 of FIG. 4, illustrates that the ribs 62 may define tabs 63 to resist upward movement of the cylindrical contours 51. Openings 64 (best seen in FIG. 1) are defined by each frame to receive the ribs 62 as the frames nest against rests 30',30".

Although in the preferred embodiment 20, a bail 44 engages oppositely directed hooks 50', 50", it is apparent that other configurations of striking members can be devised to engage other configurations of frame abutment members within the teachings of the invention.

Figure 7:
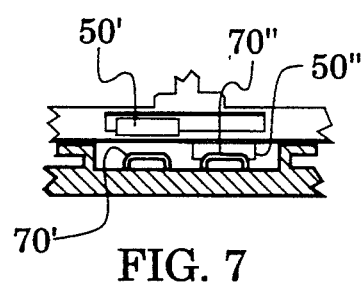
FIG. 7 is a view similar to FIG. 6 illustrating another preferred bail embodiment.

An example of another preferred striking member embodiment is shown in FIG. 7 which is a view similar to FIG. 6. In this embodiment, two bails 70', 70" are arranged to respectively strike hooks 50', 50" (the bails 70', 70" could be defined by a single wire). This embodiment is further illustrated in FIG. 8 which is a view similar to FIG. 3.

Figure 8:
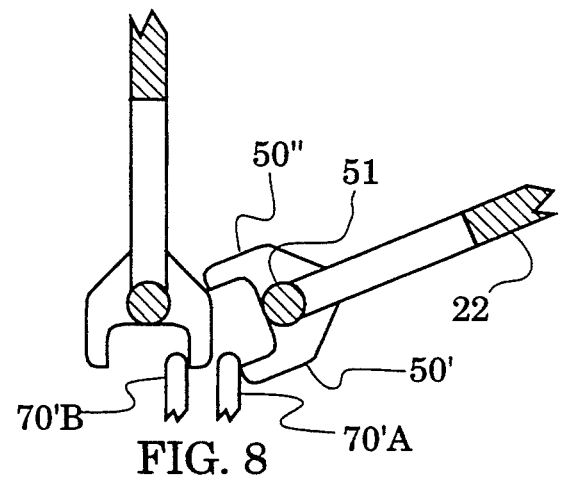
FIG. 8 is a view similar to FIG. 3 further illustrating the bail embodiment of FIG. 7.

FIG. 8 shows that the bail 70' engages the hook 50' further from the frame axis (defined by cylindrical contour 51), as shown by bail positions 70'A, 70'B (for clarity of illustration, bail 70" is removed in this view). This striking member embodiment may increase the percentage of force imparted by the moving bail that is converted into rotational force in the frames 22.

The preferred embodiment illustrated in FIG. 1, specifically defines rests in the form of inclined planes (30', 30" in FIG. 1). But, it should be understood that the invention generally teaches rests defined by other structures (e.g. legs, ribs, bosses) to support the frames 22 at any angle which facilitates viewing thereof.

From the foregoing, it should now be recognized that a media holder has been disclosed herein especially suited for search and display of a selected media. The preferred embodiments of the invention described herein are exemplary and numerous modifications, dimensional variations and rearrangements can be readily envisioned to achieve an equivalent result, all of which are intended to be embraced within the scope of the appended claims.

What is claimed is:

1. Apparatus for storing a plurality of media and displaying a selected one thereof, comprising:

a base;

a plurality of frames configured to carry said media, each of said frames pivotally mounted to said base to pivot between first and second rest positions;

an abutment member defined on each of said frames;

a striking member; and means for directing said striking member along said base in first and second opposed directions to successively strike each abutment member to pivot its associated frame between said first and second rest positions.

2. The apparatus of claim 1 wherein:

each of said frames defines an axis and a center of gravity; and each of said frames is arranged to pivot about its axis with its center of gravity disposed thereabove to facilitate pivoting between said first and second rest positions.

3. The apparatus of claim 2 wherein said abutment member comprises first and second oppositely directed hooks descending below said axis 4. The apparatus of claim 3 wherein each of said frames defines a window to receive the hooks of an adjacent frame for compact nesting thereof.

5. The apparatus of claim 2 wherein each of said frames defines a cylindrical contour coaxial with its axis and said base defines a plurality of notches configured to each receive a different contour for support thereof.

6. The apparatus of claim 5 wherein said base defines on the perimeter of each of said notches a tab to resist upward movement of an associated contour.

7. The apparatus of claim 1 wherein said striking member comprises a resilient bail.

8. The apparatus of claim 7 wherein said directing means comprises a carrier slidably mounted to said base and said bail is attached to said carrier.

9. The apparatus of claim 7 wherein each of said hooks defines a shoulder to urge said resilient bail downwards as said bail travels thereby.

10. The apparatus of claim 1 wherein said base defines first and second rests to position said frames in said first and second rest positions.

11. A method of storing a plurality of media for display of a selected one thereof, comprising the steps of:

configuring a plurality of frames to carry said media;

defining, with each of said frames, an abutment member;

mounting said frames in a base to pivot between first and second rest positions; and directing a striking member along said base in first and second opposed directions to successively strike each abutment member to pivot its associated frame between said first and second rest positions.

12. The method of claim 11 wherein said mounting step includes the steps of:

defining, on each of said frames, an axis and a center of gravity; and arranging each of said frames to pivot about its axis with its center of gravity disposed thereabove.

13. The method of claim 12 wherein said defining step comprises the step of forming said abutment member to define first and second oppositely directed hooks descending below said axis.

14. The method of claim 13 further comprising the step of defining, with each of said frames, a window to receive the hook of an adjacent frame for compact nesting thereof.

15. The method of claim 12 further comprising the steps of:
defining with each frame a cylindrical contour coaxial with said axis; and
defining with said base a plurality of notches to each receive a different contour for support thereof.

16. The method of claim 15 further comprising the step of defining, with said base, on the perimeter of each of said notches a tab to resist upward movement of an associated contour.

17. The method of claim 12 wherein said striking member comprises a resilient bail.

18. The method of claim 17 further comprising the step of defining, with each of said hooks, a shoulder to urge said resilient bail downwards as said bail travels thereby.

19. The method of claim 11 further comprising the step of defining with said base first and second rests to position said frames in said first and second rest positions.

* * * * *